(12) United States Patent
Warfen et al.

(10) Patent No.: US 8,157,523 B2
(45) Date of Patent: Apr. 17, 2012

(54) METHOD FOR THE OPERATION OF A WIND ENERGY PLANT

(75) Inventors: Karsten Warfen, Sohren (DE); Jens Altemark, Rendsburg (DE)

(73) Assignee: Repower Systems AG, Hamburg (DE)

( * ) Notice: Subject to any disclaimer, the term of this patent is extended or adjusted under 35 U.S.C. 154(b) by 682 days.

(21) Appl. No.: 12/259,703

(22) Filed: Oct. 28, 2008

(65) Prior Publication Data

US 2009/0115191 A1  May 7, 2009

(30) Foreign Application Priority Data

Nov. 2, 2007 (DE) .......................... 10 2007 052 863

(51) Int. Cl.
*B64C 11/30* (2006.01)
(52) U.S. Cl. ........................................... 416/61; 416/27
(58) Field of Classification Search ................ 416/1, 26, 416/41, 46, 61; 415/4.1, 4.3, 4.5, 908; 290/44, 290/55
See application file for complete search history.

(56) References Cited

U.S. PATENT DOCUMENTS

| | | | |
|---|---|---|---|
| 6,609,889 B1 * | 8/2003 | Vilsboll | 416/1 |
| 7,256,509 B2 | 8/2007 | Brandt et al. | |
| 2007/0189900 A1 * | 8/2007 | Rogall et al. | 416/132 B |

FOREIGN PATENT DOCUMENTS

| | | |
|---|---|---|
| CA | 2616502 | 2/2007 |
| DE | 10338127 A1 | 3/2005 |
| DE | 102005034899 A1 | 2/2007 |
| DE | 102006009127 A1 | 9/2007 |
| EP | 1499804 B1 | 5/2006 |
| WO | 2007/098894 A2 | 9/2007 |

* cited by examiner

*Primary Examiner* — Kiesha Bryant
*Assistant Examiner* — Mark Tornow
(74) *Attorney, Agent, or Firm* — Rankin, Hill & Clark LLP

(57) ABSTRACT

The invention relates to a method for the operation of a wind energy plant (10), wherein the wind energy plant (10) has a rotor (11) with a rotor axis and at least one rotor blade (15, 15') arranged on the rotor (11), wherein the rotor blade (15, 15') is adjustable or adjusted around a rotor blade axis with a predetermined rotor blade pitch angle. Further, at least one rotor blade (15, 15') is rotated into an idle position, the rotation of the rotor blade (15, 15') is braked after a first predetermined rotational position of the rotor blade (15, 15') is reached and the stand-still position of the rotor blade (15, 15') reached as a result of the braking procedure is captured. Furthermore, the invention relates to a wind energy plant (10) with a rotor (11) and at least one angle-adjustable rotor blade (15, 15') arranged on the rotor (11).

10 Claims, 2 Drawing Sheets

METHOD FOR THE OPERATION OF A WIND ENERGY PLANT

BACKGROUND OF THE INVENTION

1. Field of the Invention

The invention relates to a method for the operation of a wind energy plant, wherein the wind energy plant has a rotor with a rotor axis and at least one rotor blade arranged on the rotor, wherein the rotor blade is adjustable or adjusted around a rotor blade axis with a predetermined rotor blade pitch angle. Moreover, the invention relates to a wind energy plant with a rotor and at least one angle-adjustable rotor blade arranged on the rotor.

2. Description of Related Art

Wind energy plants of the patent applicant are known under the designation 5M, MM92, MM82, MM70 and MD77.

These known wind energy plants have a rotor with three rotor blades, wherein the rotor is coupled with a generator for the creation of an electrical power output. The generator is also coupled with an electrical network of a network operator, in order to supply created electrical energy to the network.

In many wind energy plants, the rotor blades are designed in an angle-adjustable manner around their rotor blade axes. In this manner, e.g., the alignment of the rotor blade can be adjusted depending on the amount of wind such that the energy received from the wind can be controlled or adjusted. In order to adjust the rotor blades, the wind energy plants are designed such that at least one blade adjustment system is provided for all three rotor blades.

The wind energy plants preferably have at least one rotor blade pitch device for each rotor blade, wherein the rotor blade pitch device has among other things a blade pitch drive with a drive motor. As a general rule, the relatively high speed of the rotor blade drive motor is transmitted to a slowly rotating drive wheel, which meshes with a sprocket directly connected with the rotor blade, via a gear box with a high transmission ratio. Furthermore, the rotor blade pitch device has a control device, via which the blade pitch drive is controlled.

For reasons of operating safety, these wind energy plants with so-called pitch-adjustable rotor blades generally have an emergency drive device with autarkic energy storage, for example an accumulator. This emergency drive device with its own energy storage is considered a reserve for failures, in particular when the main system for the pitch adjustment drive or rotor blade pitch drive no longer works due to a defect or due to the failure of the energy supply. The emergency drive device is provided in order to also be able to safely shut down the wind energy plant under these circumstances.

As a general rule, the wind energy plants are shut down by rotating the rotor blades into the so-called feathering position. The feathering position characterizes the rotating of the rotor blades out of the wind so that only a minimal contact surface is made available to the wind, as in the case of a flag, and the system is thus stopped or at least only driven into a very slow rotational movement. The wind energy plant will thus actuate the rotor blades by means of a pitch circuit in a normal operating mode and by means of an emergency circuit in an emergency mode.

Starting from this state of the art, the object of the invention is to improve the operation of a wind energy plant and to simplify in particular the maintenance of a wind energy plant.

BRIEF SUMMARY OF THE INVENTION

The object is solved through a method for the operation of a wind energy plant, wherein the wind energy plant has a rotor with a rotor axis and at least one rotor blade arranged on the rotor, wherein the rotor blade is adjustable or adjusted around a rotor blade axis with a predetermined rotor blade angle, further established in that the at least one rotor blade is rotated into an idle position, the rotation of the rotor blade is braked after a first predetermined rotational position of the rotor blade is reached and the standstill position of the rotor blade reached as a result of the braking procedure is captured.

The invention is based on the idea that, in the case of a switched off or shut down wind energy plant, the rotor blades are each brought into a feathering position by means of an adjusting motor and, after the feathering position or a first predetermined rotational position has been reached, the corresponding rotor blade adjusting motor and, thus, the rotation of the rotor blade is braked. After the braking procedure is complete, the rotor blade is located in a standstill position, which is achieved when the rotor blade adjusting motor will be or is completely braked.

According to the invention, anticipatory maintenance of a wind energy plant is hereby achieved, since according to the invention the breaking torque and the braking behavior of the rotor blade adjusting motor or the pitch motor is monitored based on the standstill position of the rotor blade. A brake or a corresponding locking device for the rotor blade adjusting motor is absolutely required for the wind energy plant in the event of a power outage, since a slipping through of the brake or the locking device can lead to uncontrolled load conditions on the wind energy plant, since for example, the rotor blades could rotate freely in the case of a functionally inefficient brake.

The brake torque of the brake device of the rotor blade adjusting motor or the pitch motor is monitored through the captured standstill position of the rotor blade so that information on the wear and tear of components on the rotor blade brake are obtained through the recording of the standstill positions over predetermined longer periods of time. Thus, a sensorless and/or stageless and simple monitoring of the brake torque and the brake properties of the brake are achieved in the respective rotor blade adjusting motor of a rotor blade, particularly in an automatic manner.

Based on the captured and recorded operating states with respect to the achieved standstill position, assessments about the brake behavior of a rotor blade adjusting motor can be performed reliably, based on which the maintenance measures for a rotor blade adjusting motor can be reliably adjusted.

In particular, the rotor blade of a wind energy plant is driven in a rotating manner by exterior wind movements around a rotor axis provided (mainly) transversally to the rotor blade axis.

Moreover, a further embodiment of the method is characterized in that the standstill position of the rotor blade is captured after the rotor blade has rotated into an idle position, in particular after or during a shutdown of the wind energy plant.

The at least one rotor blade is preferably rotated into an idle position after or while the wind energy plant has been shut down.

The maintenance is further improved when the brake standstill position, as the actual value, is compared with a predetermined brake set point, in particular of the brake of the blade pitch mechanism. It is hereby checked in a simple manner whether the brake of the blade adjusting motor is intact and (still) functioning sufficiently. If the actual value exceeds or falls short of the brake set point by a predetermined value, it can be determined in this manner whether the adjusting motor has a functionally inefficient brake.

Based on the captured standstill position of the rotor blade after braking, the angle can be determined based on the comparison or the difference between the brake set point and the standstill position, between the first rotational position, in which the braking of the rotor blade is activated, and the standstill position and, thus, also the braking distance can be determined. Based on the comparison performed between the actual position and the brake set point, which for example will be or is determined for a newly erected or newly maintained wind energy plant, a reliable and significant variable is made available to a remote monitoring control center or the maintenance personnel, based on which the wear and tear of the components for the braking of a rotor blade is determined or estimated, wherein the rotor blade is hereby brought in particular into a feathering position.

For example, the brake set point can be specified as the set point for a certain angle range, within which a braking takes place for an intact brake. Alternatively, the brake set point can also be predetermined as the braking distance or stopping distance.

For this, it is suggested, in particular in one embodiment, that the brake set point is determined as the average value of several measurements of the standstill position from several braking procedures. This is, for example, performed in the case of a newly erected wind energy plant or right after the performance of maintenance to the rotor blade pitch device or to the rotor blades. For example, in the case of a newly erected wind energy plant before startup, the differential path of the blade position, to which the pitch motor brake connects, i.e. for the first predetermined rotational position, up until the point in time or the position, at which the rotor blade is locked, is measured as the reference value. Several measurements, e.g. between 20 to 40 measurements, of this are performed individually and independently at each rotor blade, in order to obtain an average value for the brake set point as a specific reference value for the individual rotor blade. These measurements are preferably performed using an emergency drive device with an autarkic energy storage, e.g. a battery. After determination of the averaged brake set point predetermined for each rotor blade, these set points are saved and thus form the basis, in order to determine the deviations of the determined standstill positions for each rotor blade based on the brake set point.

Moreover, in one embodiment according to the invention, the average value can continue to be modified dynamically, i.e. continuously, during the operation of an existing wind power plant so that, for example, a brake set point is determined via a predetermined number of braking procedures. If it is determined that the newly identified standstill position is differing from the secured brake set point, then the identified difference between the two variables can be used as a measure of the condition of the brake.

A further embodiment of the method is characterized in particular in that, when the brake set point is exceeded, a warning message or maintenance message is created, wherein it is identified that the wear and tear on the brake of the rotor blade pitch device is large when a predetermined difference between the measured standstill position and the brake set point is exceeded or fallen short of so that a warning message is created in an evaluation unit and is communicated or displayed to the maintenance personnel or operating personnel. For example, the warning message could contain the note that the brake torque of the brake of a pitch motor(s) is too low, since it is determined based on the captured standstill positions and the subsequent assessment that there is wear and tear or the overall brake device is not fully functional.

Advantageously, both the determined differences between the standstill position and the brake set point are determined and saved, wherein the corresponding values are saved for anticipatory maintenance and accordingly displayed or communicated to the maintenance personnel. The temporal progression of the brake properties of the brakes of the adjusting motor are determined based on the determined and saved deviations, wherein it is possible in a further embodiment to determine the point in time to perform the next maintenance based on the determined values.

Moreover, it is advantageous in a further embodiment if warning messages or maintenance messages with different priorities are created. If, for example, an exceedance of a differential value between the standstill position and the corresponding brake set point is determined for the first time, this first deviation is communicated. If within a predetermined number of additional braking procedures and/or within a specific period of time after the first deviation of the standstill position outside of a tolerance range or differential range, additional deviations are determined outside of the tolerance range or the differential range in a corresponding evaluation system, then a maintenance message of a higher priority can be created, whereupon for example the system is stopped until the maintenance is performed.

Moreover, a further embodiment provides that a maintenance message concerning the state of a brake used for the braking procedure is created during the braking of the rotor blade and when a second predetermined rotational position of the rotor blade is exceeded.

Each pitch system of a rotor blade typically has two limit switches for the arrangement of the rotor blade in the feathering position, wherein a first limit switch should detect the rotation of the rotor blade or the rotor blades beyond the feathering position. The first limit switch (first predetermined rotational position of the rotor blade) is for example 91° and the second limit switch (second predetermined rotational position of the rotor blade) is 95°. If the first limit switch is triggered by the rotation of the rotor blade into the feathering position, the rotor blade is mechanically braked via the brake of the pitch system or the rotor blade adjusting motor. The rotor blade will hereby stop in its rotation even before the second limit switch in the functional state of the system.

The second limit switch (for example at the 95° position of the rotor blade) is then triggered if the rotor blade cannot be fully braked before the second limit switch so that the operating control system detects an error in the brake system or on the brakes of the adjusting motor. If the second limit switch or the second predetermined rotational position of the rotor blade is crossed despite the braking of the rotor blade, it is communicated to the maintenance service via the operating control system for example through a maintenance message that maintenance must urgently be performed on the wind energy plant.

Moreover, it is advantageous in a further embodiment of the method if the standstill position of the rotor blade is captured at predetermined time intervals. For example, the standstill positions of a rotor blade can be captured in particular if a self-test is performed routinely at regular, e.g. weekly, intervals. These self-tests are performed in particular using emergency drive devices, i.e. in a so-called "emergency run."

The standstill position is advantageously captured during a safety test or a self-test of the wind energy plant.

The method is further characterized in a further embodiment in that the braking of the rotation of the rotor blade is performed in a feathering position of the rotor blade.

In order to enable anticipatory maintenance of the pitch motor brakes or the rotor blade brake, it is also advantageously provided that the standstill positions of the rotor blade are saved in a storage unit and/or evaluated in an evaluation unit. This can, for example, be performed within the wind energy plant's own operating control system or decentrally on a remote monitoring unit.

The object of the invention is further solved through a wind energy plant with a rotor and at least one angle-adjustable rotor blade arranged on the rotor, wherein the wind energy plant is operated according to the method described above for the operation of the wind energy plant.

The invention is described below, without restricting the general intent of the invention, in reference to the attached drawings, whereby we expressly refer to the drawings with regard to the disclosure of all details according to the invention that are not explained in greater detail in the text.

DETAILED DESCRIPTION OF THE INVENTION

In the following figures, the same or similar types of elements or corresponding parts are provided with the same reference numbers in order to prevent the item from needing to be reintroduced.

Figure 1:
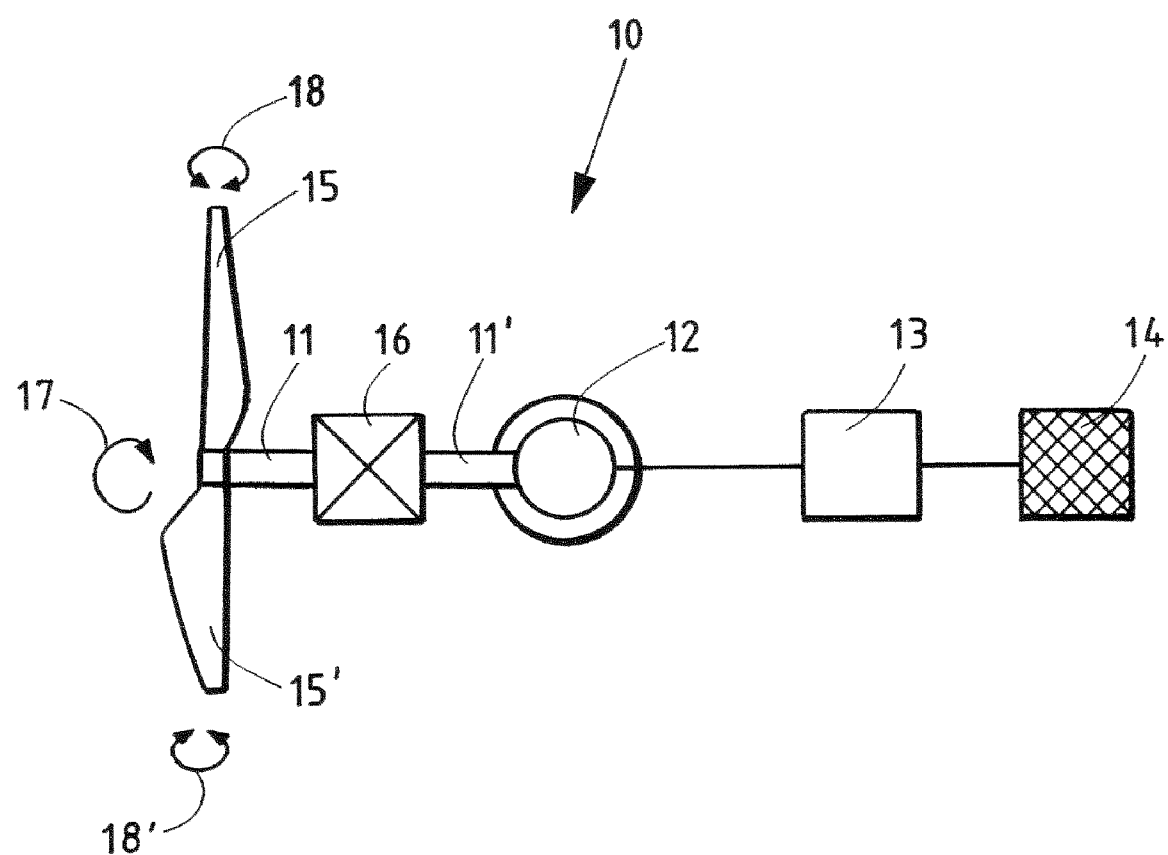
FIG. 1 shows a schematic representation of the main components of a wind energy plant and FIG. 2 shows a simplified flow chart according to the invention.

FIG. 1 shows very schematically a wind energy plant 10, comprising a rotor 11, on which rotor blades 15 and 15' are arranged. The rotor 11 is connected with a gear box 16. The gear box 16 is connected through a shaft 11' with a generator 12. The rotor 11 is rotatable, according to an indicated rotational movement 17. Through the corresponding rotation of the rotor 11 and via the drive 16 also of the shaft 11', a conventional generator 12 such as an asynchronous generator can create an electrical power output, which can be made available to a network 14, to which, for example, consumers are connected, via a converter 13.

Corresponding conventional controls of speed-variably operated systems are, for example, described in the book by Siegfried Heier entitled "Windkraftanlagen, Systemauslegung, Netzintegration und Regelung" (Wind Power Plants, System Design, Network Integration and Control), Verlag Teubner, 2005, pages 320-328.

FIG. 1 also still indicates the change in the blade angle of the rotor blades 15, 15' and namely via a blade angle pitch movement 18 or 18'. The power uptake of the rotor 11 or of the connected drive train(s) and the rotor blades 15 and 15' associated with the rotor are affected through the adjustment of the blade angle (pitch) of the rotor blades 15 and 15'.

Moreover, each rotor blade 15, 15' has an individual pitch device, in order to set the blade angle of the rotor blades according to a specification with a predetermined rotor blade pitch angle. Moreover, the individual pitch device advantageously has measurement sensors arranged on the rotor, whereby the individual pitch device is able to obtain the required measurement signals in an autarkic manner and without accessing a central control device and its sensors or signal processing. In particular, rotor blade pitch angle sensors, rotor position angle sensors, rotor speed sensors, longitudinal acceleration sensors, transverse acceleration sensors, rotational acceleration sensors, load sensors and/or centrifugal acceleration sensors or other sensors known to a person skilled in the art can be provided as measurement sensors on the root of the rotor blades.

Moreover, the individual pitch device of each rotor blade is advantageously provided with an emergency module, which triggers an emergency run to a shutdown position in the case of the failure of remaining components, the controller in particular. The individual pitch device is, thus, able to automatically and independently bring the rotor blade into its shutdown position, i.e. into its feathering position, in the case of a failure of a controller by means of an emergency run. The emergency run is preferably uncontrolled so that the failure of the controller or elements of the measurement device does not impact the emergency run.

A generic wind energy plant with individual pitch devices is disclosed in DE 10 2005 034 899 A1. Moreover, DE 10 2006 009 127 A1 describes an energy supply for a blade adjustment device of a wind energy plant. Both documents are fully and expressly included in the disclosure of the present patent application, wherein explicit reference is made to these documents for further details on the individual pitch devices and the energy supply. Furthermore, document DE 103 38 127 A1 is also fully included in the disclosure of the present application, wherein explicit reference is made to this document for other details of an individual pitch device or rotor blade pitch device.

Figure 2:
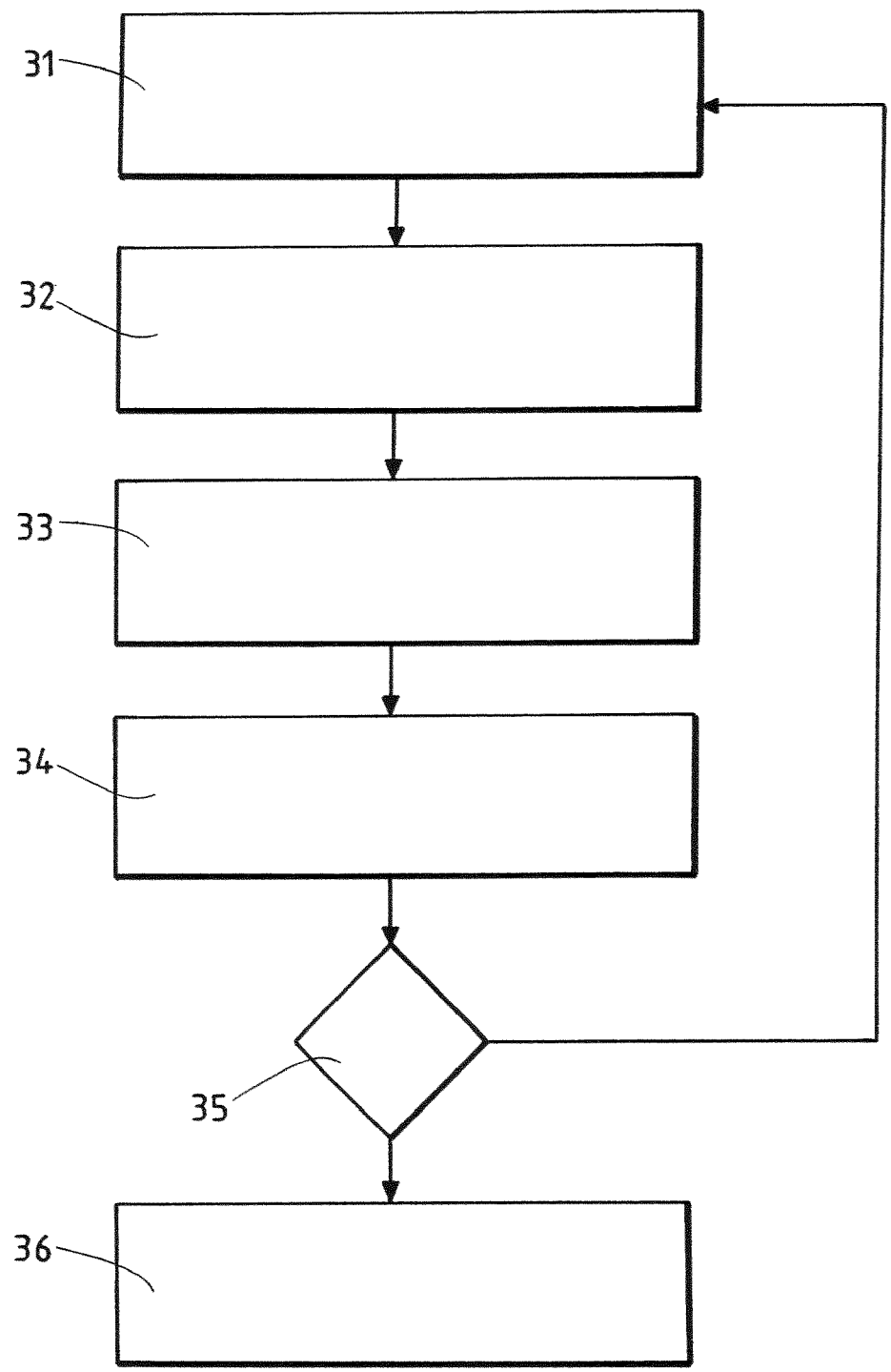

FIG. 2 shows schematically the process for the testing of the torque or for the monitoring of the brake properties of a brake of an individual pitch adjustment device for a rotor blade of a wind energy plant.

In process step 31, the wind energy plant is in normal mode, i.e. electrical power is fed to a consumer network by the wind energy plant. After a predetermined period of time, a self-test and thus a brake program of the wind energy plant is performed in process step 32, wherein this self-test is performed at regular intervals, e.g. weekly, on the wind energy plant, preferably when wind speed is low.

The rotor blades are hereby rotated into the so-called feathering position using an emergency drive device by means of the rotor blade adjusting motor. For this, a direct current motor is directly coupled with a battery for example as a drive motor so that the corresponding rotor blade can be brought into the so-called feathering position and out of the wind. During this battery-supported rotation of the rotor blade, the emergency energy supply in the form of the battery is also simultaneously tested. This type of battery test is normally performed on a wind energy plant on a weekly basis.

In process step 33, the moment of the closing of the pitch motor brake or the brake of the rotor blade adjusting motor is then captured during the rotation of the rotor blade(s) into the feathering position, wherein this (first) rotational position of the rotor blade or the rotor blades is for example 91°. Through the trigger of this first limit switch on the first rotational position, on which the brake of the adjusting motor is activated, the rotation of the rotor blade is braked, wherein the angle is then measured from the moment of the closing of the pitch motor brake (first rotational position) up to the standstill of the motor (standstill position of the rotor blade) in process step 33.

Based on the measured angle, i.e. the measured standstill position between the closing of the pitch motor brake up to the standstill of the motor and the rotation of the rotor blade, a comparison of the standstill position with a saved set point, which is determined individually for each rotor blade, for example after the erection of a new wind energy plant based on several brake procedures on the rotor blades, takes place in process step 34. A brake set point is hereby achieved for a standstill position of the rotor blade when the brake of the rotor blade adjusting motor is activated.

Based on a subsequent comparative step 35, it is checked whether the measured standstill position or the measured standstill angle lies within a predetermined tolerance range around the brake set point. If the difference between the set point and the measured standstill position or the standstill angle is outside the tolerance range and, thus, greater than a predetermined difference, a warning to the remote maintenance device is created and transmitted in process step 36 so that the service personnel know that maintenance of the brake system of the pitch motor needs to be performed on the wind energy plant.

However, if the measured difference between the standstill position and the set point is within the tolerance range, then the wind energy plant resumes normal mode again as in process step 31.

List Of References
- 10 Wind energy plant
- 11 Rotor
- 11' Shaft
- 12 Generator
- 13 Converter
- 14 Network
- 15, 15' Rotor blade
- 16 Gear box
- 17 Rotational movement
- 18, 18' Blade pitch movement (pitching)
- 31 Process step
- 32 Process step
- 33 Process step
- 34 Process step
- 35 Comparison
- 36 Process step

The invention claimed is:

1. A method for the operation of a wind energy plant (10), wherein the wind energy plant (10) has a rotor (11) with a rotor axis and at least one rotor blade (15, 15') arranged on the rotor (11), wherein the rotor blade (15, 15') is adjustable or adjusted around a rotor blade axis with a predetermined rotor blade pitch angle, comprising the steps of:
   providing a rotor blade adjusting motor for adjusting the at least one rotor blade and a brake device for the rotor blade adjusting motor,
   rotating the at least one rotor blade (15, 15') into an idle position,
   activating the brake device of the rotor blade adjusting motor so as to brake the rotation of the rotor blade (15, 15') when a first predetermined rotational position of the rotor blade (15, 15') is reached,
   capturing the standstill position of the rotor blade (15, 15') reached as a result of the braking procedure, and
   monitoring the brake torque of the brake device of the rotor blade adjusting motor through the captured standstill position of the rotor blade;
   wherein the standstill position or the brake standstill position as the actual value is compared with a predetermined brake set point.

2. The method according to claim 1, wherein the standstill position of the rotor blade (15, 15') is captured after the rotor blade (15, 15') has been rotated into an idle position after or during a shutdown of the wind energy plant (10).

3. The method according to claim 1, wherein the at least one rotor blade (15, 15') is rotated into an idle position after shutdown of the wind energy plant (10) or during shut-down of the wind energy plant (10).

4. The method according to claim 1, wherein the brake set point is determined as the average value of several measurements of the standstill position from several braking procedures.

5. The method according to claim 1, wherein a warning message or maintenance message is created when the brake set point is exceeded.

6. The method according to claim 1, wherein during the braking of the rotor blade (15, 15') and in the case of the exceedance of a second predetermined rotational position of the rotor blade (15, 15') a maintenance message concerning the state of a brake used for the brake procedure is created.

7. The method according to claim 1, wherein the standstill position of the rotor blade (15, 15') is captured at predetermined time intervals.

8. The method according to claim 1, wherein the standstill position is captured during a safety test or a self-test of the wind energy plant (10).

9. The method according to claim 1, wherein the braking of the rotation of the rotor blade (15, 15') is performed in a feathering position of the rotor blade (15, 15').

10. The method according to claim 1, wherein the standstill positions of the rotor blade (15, 15') are saved in a storage unit and/or evaluated in an evaluation unit.

* * * * *